US011611978B2

United States Patent
Sarkis et al.

(10) Patent No.: US 11,611,978 B2
(45) Date of Patent: Mar. 21, 2023

(54) REFERENCE MODULATION AND CODING SCHEME TABLE IN SIDELINK SIGNALING

(71) Applicant: QUALCOMM Incorporated, San Diego, CA (US)

(72) Inventors: Gabi Sarkis, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/146,972

(22) Filed: Jan. 12, 2021

(65) Prior Publication Data

US 2021/0219318 A1   Jul. 15, 2021

Related U.S. Application Data

(60) Provisional application No. 62/961,016, filed on Jan. 14, 2020.

(51) Int. Cl.
*H04W 72/12*   (2009.01)
*H04L 5/00*   (2006.01)
(Continued)

(52) U.S. Cl.
CPC ....... *H04W 72/1273* (2013.01); *H04L 5/0051* (2013.01)

(58) Field of Classification Search
CPC ............ H04W 72/042; H04W 72/1273; H04L 5/0051
See application file for complete search history.

(56) References Cited

U.S. PATENT DOCUMENTS

2018/0324010 A1   11/2018   Gulati et al.
2019/0306923 A1*   10/2019   Xiong .................. H04L 5/0051
(Continued)

OTHER PUBLICATIONS

Interdigital Inc: "Physical Layer Structure for NR V2X Sidelink," 3GPP Draft, 3GPP TSG RAN WG1 #99, R1-1912738, 3rd Generation Partnership Project (3GPP), Mobile Competence Centre, 650, Route Des Lucioles, F-06921, Sophia-Antipolis Cedex, France, vol. RAN WG1. No. Reno, USA; Nov. 18, 2019-Nov. 22, 2019, Nov. 8, 2019 (Nov. 8, 2019), XP051820174, 16 pages, Retrieved from the Internet: URL: https://ftp.3gpp.org/tsg_ran/WG1_RL1/TSGR1_99/Docs/R1-1912738.zip R1-1912738 Physical Layer Structure for NR V2X Sidelink_final.docx [retrieved on Nov. 8, 2019], section 2.

(Continued)

*Primary Examiner* — Kent Krueger
(74) *Attorney, Agent, or Firm* — Holland & Hart LLP

(57) ABSTRACT

Methods, systems, and devices for wireless communications are described. A receiving device (e.g., a base station and/or a user equipment) may receive, over a control channel, a first control signal identifying first scheduling information for a data transmission to the receiving device. The receiving device may determine a number of resource elements of a shared channel for a second control signal based at least in part on a first modulation and coding scheme (MCS) table associated with the second control signal. The receiving device may receive, over the resource elements of the shared channel and based at least in part on the first control signal, the second control signal identifying second scheduling information for the data transmission. The receiving device may decode the second control signal based at least in part on the first MCS table.

10 Claims, 14 Drawing Sheets

(51) Int. Cl.
*H04W 72/04* (2009.01)
*H04W 72/1273* (2023.01)

(56) References Cited

U.S. PATENT DOCUMENTS

| | | | |
|---|---|---|---|
| 2020/0287654 A1* | 9/2020 | Xi | H03M 13/13 |
| 2020/0404624 A1* | 12/2020 | Roth | H04W 4/40 |
| 2021/0099265 A1* | 4/2021 | Shin | H04W 72/0453 |
| 2021/0345360 A1* | 11/2021 | Yeo | H04W 4/46 |
| 2022/0007403 A1* | 1/2022 | Li | H04W 72/1289 |
| 2022/0053513 A1* | 2/2022 | Ryu | H04L 1/0025 |
| 2022/0061041 A1* | 2/2022 | Chen | H04L 5/0048 |

OTHER PUBLICATIONS

Interdigital Inc: "Physical Layer Structure for NR V2X Sidelink", 3GPP Draft, 3GPP TSG RAN WG1 #99, R1-1913274, 3rd Generation Partnership Project (3GPP), Mobile Competence Centre, 650, Route Des Lucioles, F-06921, Sophia-Antipolis Cedex, France, vol. RAN WG1, No. Reno, U.S.A, Nov. 18, 2019-Nov. 22, 2019, Nov. 19, 2019 (Nov. 19, 2019), XP051826621, 18 pages, Retrieved from the Internet: URL: https://ftp.3gpp.org/tsg_ran/WG1_RL1/TSGR1_99/Docs/R1-1913274.zip R1-1913274 Physical Layer Structure for NR V2X Sidelink_final.docx [retrieved on Nov. 19, 2019], section 2.
International Search Report and Written Opinion—PCT/US2021/013252—ISA/EPO—dated Apr. 12, 2021 (201280WO).

* cited by examiner

REFERENCE MODULATION AND CODING SCHEME TABLE IN SIDELINK SIGNALING

CROSS REFERENCE

The present Application for patent claims the benefit of U.S. Provisional Patent Application No. 62/961,016 by SARKIS et al., entitled "REFERENCE MODULATION AND CODING SCHEME TABLE IN SIDELINK SIGNALING," filed Jan. 14, 2020, assigned to the assignee hereof, and expressly incorporated by reference herein.

BACKGROUND

The following relates generally to wireless communications, and more specifically to reference modulation and coding scheme (MCS) table in sidelink signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support a reference modulation and coding scheme (MCS) table in sidelink signaling. Generally, the described techniques provide for a reference MCS table (e.g., a first MCS table) to be identified and used for decoding a control channel signal received over a shared channel. That is, a receiving device (e.g., a first user equipment (UE) and/or base station) may receive a first control signal over a control channel that identifies scheduling information for a data transmission. The receiving device may then receive a second control signal over a shared channel identifying additional scheduling information for the data transmission. The receiving device may determine or otherwise identify the reference MCS table (e.g., the first MCS table) associated with the second control signal, and use this reference MCS table for decoding the second control signal. For example, the reference MCS table may be a specified MCS table (e.g., a default, fixed, or otherwise known MCS table used for every second control signal), an MCS table preconfigured for a resource pool over which the second control signal is scheduled, and/or an explicitly configured (e.g., separately configured) with a resource pool over which the second control signal is scheduled. The receiving device may identify a second MCS table, e.g., from the second control signal, to be used for decoding the data transmission, and then receive and decode the data transmission accordingly.

A method of wireless communication at a receiving device is described. The method may include receiving, over a control channel, a first control signal identifying first scheduling information for a data transmission to the receiving device, determine a number of resource elements of a shared channel for a second control signal based at least in part on a first MCS table associated with the second control signal, receiving, over the resource elements of the shared channel and based on the first control signal, the second control signal identifying second scheduling information for the data transmission, and decoding the second control signal based on the first MCS table.

An apparatus for wireless communication at a receiving device is described. The apparatus may include a processor, memory coupled with the processor, and instructions stored in the memory. The instructions may be executable by the processor to cause the apparatus to receive, over a control channel, a first control signal identifying first scheduling information for a data transmission to the receiving device, determine a number of resource elements of a shared channel for a second control signal based at least in part on a first MCS table associated with the second control signal, receive, over the resource elements of the shared channel and based on the first control signal, the second control signal identifying second scheduling information for the data transmission, and decode the second control signal based on the first MCS table.

Another apparatus for wireless communication at a receiving device is described. The apparatus may include means for receiving, over a control channel, a first control signal identifying first scheduling information for a data transmission to the receiving device, determine a number of resource elements of a shared channel for a second control signal based at least in part on a first MCS table associated with the second control signal, receiving, over the resource elements of the shared channel and based on the first control signal, a second control signal identifying second scheduling information for the data transmission, and decoding the second control signal based on the first MCS table.

A non-transitory computer-readable medium storing code for wireless communication at a receiving device is described. The code may include instructions executable by a processor to receive, over a control channel, a first control signal identifying first scheduling information for a data transmission to the receiving device, determine a number of resource elements of a shared channel for a second control signal based on a first MCS table associated with the second control signal, receive, over the resource elements of the shared channel and based on the first control signal, a second control signal identifying second scheduling information for the data transmission, and decode the second control signal based on the first MCS table.

Some examples of the method, apparatuses, and non-transitory computer-readable medium described herein may further include operations, features, means, or instructions for identifying the first MCS table based on the first scheduling information.

Some examples of the method, apparatuses, and non-transitory computer-readable medium described herein may further include operations, features, means, or instructions for identifying a resource pool over which the second control signal may be to be received, and identifying the first MCS table based on the resource pool.

Some examples of the method, apparatuses, and non-transitory computer-readable medium described herein may further include operations, features, means, or instructions for receiving a configuration signal identifying a resource pool over which the second control signal may be to be received and the first MCS table to be used for the resource pool, and identifying the first MCS table based on the configuration signal.

Some examples of the method, apparatuses, and non-transitory computer-readable medium described herein may further include operations, features, means, or instructions for performing at least one of a phase-tracking reference signal determination, or a transport block size calculation, or a combination thereof, based on the first MCS table.

Some examples of the method, apparatuses, and non-transitory computer-readable medium described herein may further include operations, features, means, or instructions for receiving, over the shared channel, the data transmission, and decoding the data transmission using a second MCS table identified in the first control signal.

A method of wireless communication at a transmitting device is described. The method may include transmitting, over a control channel, a first control signal identifying first scheduling information for a data transmission to a receiving device, determining a number of resource elements of a shared channel for a second control signal based on a first MCS table associated with the second control signal, and transmitting, over the resource elements of the shared channel and based on the first control signal, the second control signal identifying second scheduling information for the data transmission, where the second control signal is decoded based on the first MCS table.

An apparatus for wireless communication at a transmitting device is described. The apparatus may include a processor, memory coupled with the processor, and instructions stored in the memory. The instructions may be executable by the processor to cause the apparatus to transmit, over a control channel, a first control signal identifying first scheduling information for a data transmission to a receiving device, determine a number of resource elements of a shared channel for a second control signal based at least in part on a first MCS table associated with the second control signal, and transmit, over the resource elements of the shared channel and based on the first control signal, a second control signal identifying second scheduling information for the data transmission, where the second control signal is decoded based on the first MCS table.

Another apparatus for wireless communication at a transmitting device is described. The apparatus may include means for transmitting, over a control channel, a first control signal identifying first scheduling information for a data transmission to a receiving device, determining a number of resource elements of a shared channel for a second control signal based at least in part on a first MCS table associated with the second control signal, and transmitting, over the resource elements of the shared channel and based on the first control signal, a second control signal identifying second scheduling information for the data transmission, where the second control signal is decoded based on the first MCS table.

A non-transitory computer-readable medium storing code for wireless communication at a transmitting device is described. The code may include instructions executable by a processor to transmit, over a control channel, a first control signal identifying first scheduling information for a data transmission to a receiving device, determine a number of resource elements of a shared channel for a second control signal based on a first MCS table associated with the second controls signal, and transmit, over the resource elements of the shared channel and based on the first control signal, a second control signal identifying second scheduling information for the data transmission, where the second control signal is decoded based on the first MCS table.

Some examples of the method, apparatuses, and non-transitory computer-readable medium described herein may further include operations, features, means, or instructions for selecting the first MCS table based on the first scheduling information.

Some examples of the method, apparatuses, and non-transitory computer-readable medium described herein may further include operations, features, means, or instructions for selecting a resource pool over which the second control may be to be received, where the first MCS table may be based on the resource pool.

Some examples of the method, apparatuses, and non-transitory computer-readable medium described herein may further include operations, features, means, or instructions for transmitting a configuration signal identifying a resource pool over which the second control signal may be to be received and the first MCS table to be used for the resource pool, where the first MCS table may be identified based on the configuration signal.

Some examples of the method, apparatuses, and non-transitory computer-readable medium described herein may further include operations, features, means, or instructions for transmitting, over the shared channel, the data transmission, where the data transmission is decoded using a second MCS table identified in the second control signal.

DETAILED DESCRIPTION

Wireless communication systems may use different interfaces to support wireless communications between devices.

For example, a Uu interface may be used to support wireless communications between a base station and a user equipment (UE). A PC5 interface may be used to support wireless communications between UEs over a sidelink connection. Each interface type is unique in terms of configurations, requirements, etc. For example, two UEs may establish a sidelink connection over a PC5 interface, with the sidelink connection supporting wireless communications between the UEs. One UE may act as the scheduling UE (e.g., functionally serving as the base station for the sidelink connection), while the other UE serves as the scheduled UE (e.g., functionally acting as the UE for the sidelink connection). However, the configurations for such sidelink channels may result in ambiguity with respect to various sidelink communication parameters, which may limit or interrupt communications between the UEs.

Aspects of the disclosure are initially described in the context of a wireless communications system. Generally, the described techniques provide for a reference modulation and coding scheme (MCS) table (e.g., a first MCS table) to be identified and used for decoding a control channel signal received over a shared channel. That is, a receiving device (e.g., a UE and/or base station) may receive a first control signal over a control channel that identifies scheduling information for a data transmission. The receiving device may then receive a second control signal over a shared channel identifying additional scheduling information for the data transmission. The receiving device may determine or otherwise identify the reference MCS table (e.g., the first MCS table) associated with the second control signal, and use this reference MCS table for decoding the second control signal. For example, the reference MCS table may be a specified MCS table (e.g., a default, fixed, or otherwise known MCS table), an MCS table preconfigured for a resource pool over which the second control signal is scheduled, and/or explicitly configured (e.g., separately configured) with a resource pool over which the second control signal is scheduled. The receiving device may identify a second MCS table, e.g., from the second control signal, for the data transmission, and then receive and decode the data transmission using the second MCS table.

Aspects of the disclosure are further illustrated by and described with reference to apparatus diagrams, system diagrams, and flowcharts that relate to a reference MCS table in sidelink signaling.

Figure 1:
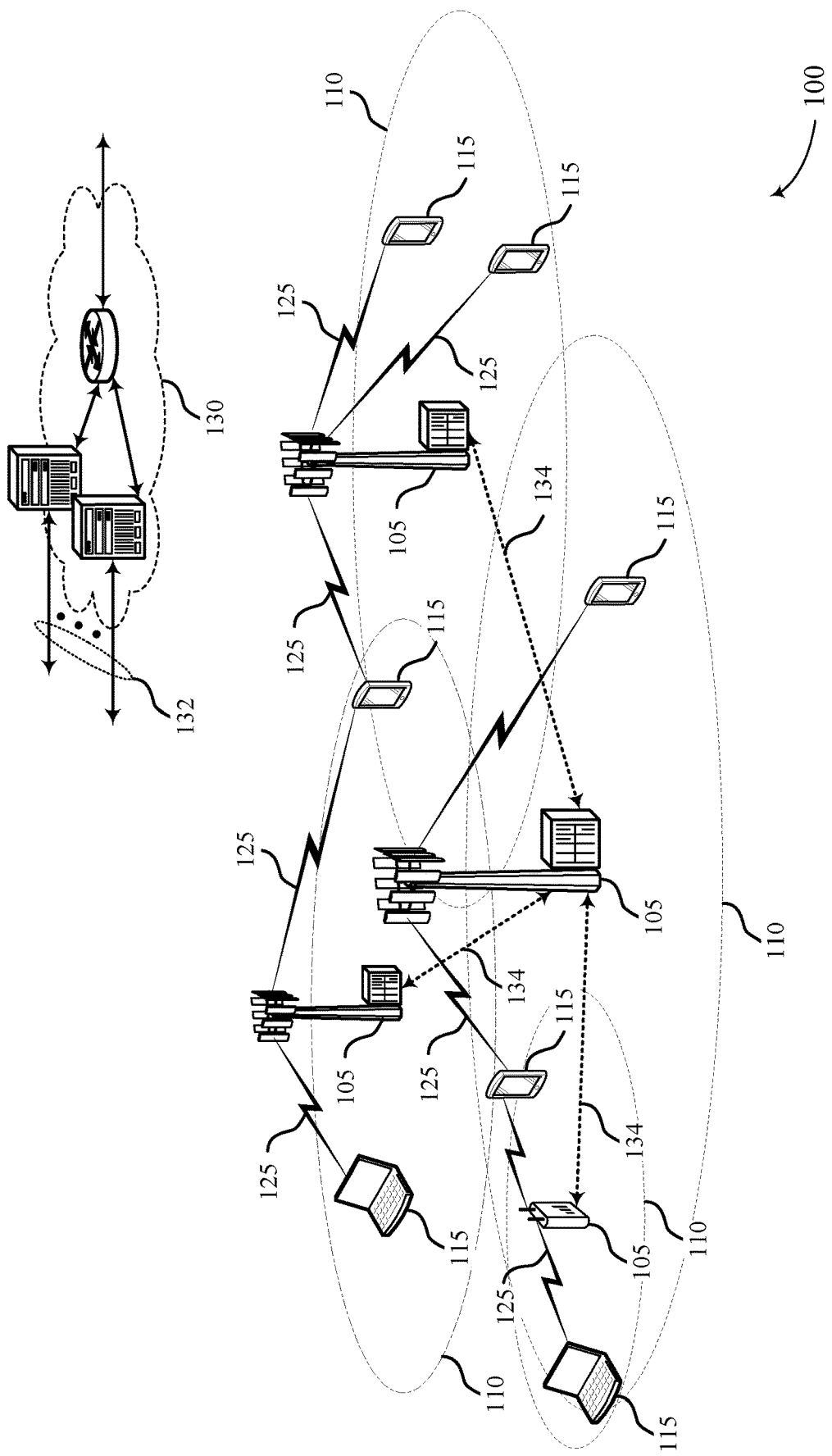
FIG. 1 illustrates an example of a system for wireless communications that supports a reference modulation and coding scheme (MCS) table in sidelink signaling in accordance with aspects of the present disclosure.

FIG. 1 illustrates an example of a wireless communications system 100 that supports a reference MCS table in sidelink signaling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A receiving device (e.g., which may be a UE 115 and/or base station 105 in the context of the described techniques) may receive, over a control channel, a first control signal identifying first scheduling information for a data transmission to the receiving device. The receiving device may determine a number of resource elements of a shared channel for a second control signal based at least in part on a first MCS table associated with the second control signal. The receiving device may receive, over the resource elements of the shared channel and based at least in part on the first control signal, the second control signal identifying second scheduling information for the data transmission. The receiving device may decode the second control signal based at least in part on the first MCS table.

A transmitting device (e.g., which may be a UE 115 and/or base station 105 in the context of the described techniques) may transmit, over a control channel, a first control signal identifying first scheduling information for a data transmission to a receiving device. The transmitting device may determine a number of resource elements of a shared channel for a second control signal based at least in part on a first MCS table associated with the first control signal. The transmitting device may transmit, over the resource elements of the shared channel and based at least in part on the first control signal, a second control signal identifying second scheduling information for the data transmission, wherein the second control signal is decoded based at least in part on the first MCS table.

Figure 2:
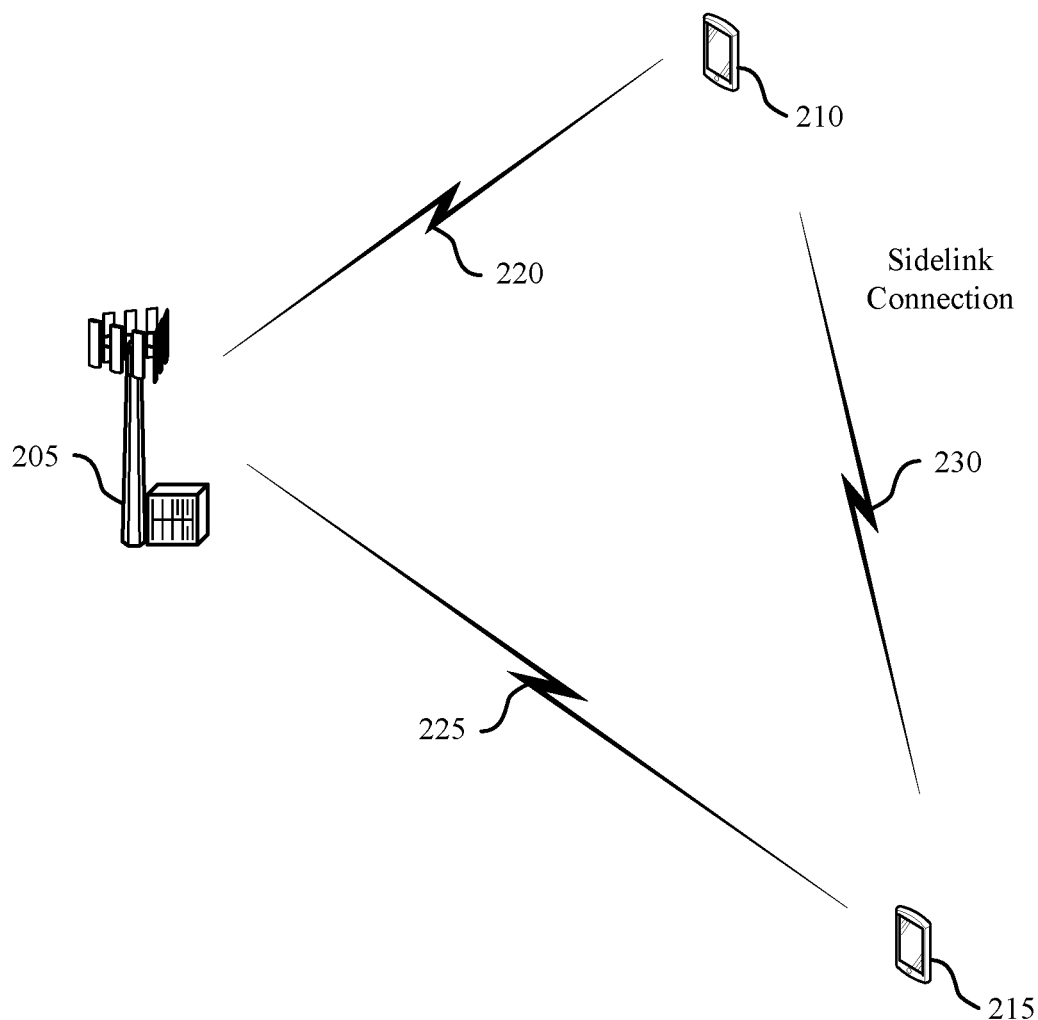
FIG. 2 illustrates an example of a wireless communication system that supports a reference MCS table in sidelink signaling in accordance with aspects of the present disclosure.

FIG. 2 illustrates an example of a wireless communication system 200 that supports a reference MCS table in sidelink signaling in accordance with aspects of the present disclosure. In some examples, wireless communication system 200 may implement aspects of wireless communication system 100. Wireless communication system 200 may include a base station 205, a UE 210, and a UE 215, which may be examples of the corresponding devices described herein. In some examples, UE 210 and/or UE 215 may be examples of a road-side unit (RSU), e.g., in a vehicle-to-infrastructure (V2I) network.

In some aspects, UE 210 and UE 215 may be communicating over a sidelink connection. Although the techniques discussed herein are generally described with reference to two UEs communicating over a sidelink channel, it is to be understood that these techniques may be implemented between any wireless devices operating in a wireless communication system utilizing any interface type. That is, references to a receiving device may include a UE (such as UEs 210 and/or 215) and/or a base station (such as base station 205) that are receiving a data transmission from a transmitting device. Similarly, references to a transmitting device may include a UE (such as UEs 210 and/or 215) and/or a base station (such as base station 205) that are transmitting a data transmission to a receiving device.

Wireless communication systems may use different interfaces to support wireless communications between wireless devices. For example, a Uu interface may be used to support wireless communications between base station 205 and UE 210 and/or UE 215 over links 220 and/or 225, respectively. A PC5 interface may be used to support wireless communications between UE 210 and UE 215 over a sidelink connection. Each interface type is unique in terms of configurations, requirements, etc. UE 210 and UE 215 may establish a sidelink connection over the PC5 interface, with the sidelink connection supporting wireless communications between UEs 210 and 215 over sidelink 230.

In some aspects, multiple MCS tables may be supported for wireless communication system 200. In one non-limiting example, three MCS tables may typically be supported for the Uu interface (e.g., links 220/225) for CP-OFDM communications, which are also supported for sidelink communications over the PC5 interface of sidelink 230. Support for at least one of the MCS tables (e.g., the low-spectral efficiency 64QAM MCS table) may be an optional UE feature for both of the Uu and PC5 interfaces. Typically, for each configured resource pool, at least one of the MCS tables may also be configured. That is, in at least some examples a particular MCS table to be used is tied or otherwise linked to the resource pool over which the communication is performed. Therefore, wireless devices receiving communications over a particular resource pool use the MCS table associated with that resource pool for decoding the received communications.

In some aspects, wireless communication system 200 may generally support UEs 210 and/or 215 exchanging or otherwise reporting capability information, e.g., via UE capability messaging. For example, UE capability reporting may be supported over a PC5 interface (e.g., at least for unicast links). However, if a transmitting UE wishes to use an MCS table other than the one pre-configured for a particular resource pool, ambiguity may arise regarding which MCS table is used unless explicit signaling his used to convey this information. In some aspects, this explicit signaling may occur in the form of a control signal, such as a downlink control information (DCI) in the Uu interface and/or a sidelink control information (SCI) in the PC5 interface, which may increase signaling costs.

More particularly and with reference to the PC5 interface, the SCI may be implemented in two stages. The first stage may include SCI-1 (e.g., a first control signal) being communicated over a control channel (e.g., a physical sidelink control channel (PSCCH)) and a second stage may include SCI-2 (e.g., a second control signal) being communicated over a shared channel (e.g., physical sidelink shared channel (PSSCH)). In some examples, the second control signal (e.g., SCI-2) may be modulated using QPSK.

In some aspects, the first control signal (e.g., SCI-1) may carry at least some scheduling information (e.g., first scheduling information) for a data transmission being scheduled by SCI-1/SCI-2. The first control signal may also contain information needed to decode SCI-2. For example, a second stage SCI format field in SCI-1 may be used to determine the payload size and format of SCI-2. The MCS, beta-offset indicator, and second stage SCI format fields in SCI-1 are used to determine the number of second stage control resource elements (e.g., the number of resource elements for SCI-2). However, SCI-1 does not identify the MCS table used to decode SCI-2. One approach to resolve this may include the MCS table used for SCI-2 to be included or otherwise indicated in SCI-1. However, this approach is undesirable because it increases the size of SCI-1, thereby degrading the performance of SCI-1 in the process. However, knowing which MCS table is to be used for decoding SCI-2 is important for such decoding, and additionally to other functions such as, but not limited to, a transport block size (TBS) determination, phase-tracking reference signal (PT-RS) determination, and the like. Accordingly, aspects of the described techniques provide various mechanisms for determining the MCS table used for SCI-2.

It is to be understood that SCI-2 (e.g., the second control signal) may generally identify the MCS table (e.g., a second MCS table) to be used for decoding the data transmission scheduled by SCI-1 and SCI-2. However, SCI-2 must first be decoded before the second MCS table can be determined.

Accordingly, aspects of the described techniques provide for the MCS indication included in SCI-2 (e.g., the second MCS table used for decoding the data transmission) and a reference MCS table (e.g., the first MCS table) being used for SCI-2. The reference MCS table (e.g., the first MCS table) may be defined according to at least three alternatives.

In a first alternative, the reference MCS table may simply be a specified MCS table (e.g., a 64 QAM MCS table). The reference MCS table may be a fixed or known MCS table that is used for each transmission of an SCI-2. That is, the reference MCS table may be identified based on the first scheduling information indicated in the first control signal (e.g., SCI-1), e.g., be known based on SCI-1 being transmitted, which triggers the known reference MCS table for SCI-2.

In a second alternative, the reference MCS table may be the MCS table that is (pre)configured for the resource pool (e.g., the resource pool over which SCI-2 is communicated). That is, a scheduling constraint may be implemented indicating that the reference MCS table for SCI-2 may be the MCS table already configured for the resource pool over which SCI-2 is communicated. That is, identifying the resource pool over which SCI-2 is communicated may enable identifying the reference MCS table. In some aspects of this second alternative, the reference MCS table may use one RRC parameter in total for the MCS tables.

In a third alternative, the reference MCS table may be explicitly (pre)configured for/with the resource pool (e.g., using two RRC parameters total for MCS tables, where the reference MCS table is indicated separately). That is, a configuration signal may be used to identify the resource pool over which SCI-2 is to be received and indicating the reference MCS table that is to be used for that resource pool. Accordingly, the reference MCS table (e.g., the first MCS table) may be identified based on the configuration signal.

Although discussed with reference to RRC signaling, it is to be understood that the signaling described herein may include MAC control element (CE) signaling, the RRC signaling, upper layer signaling, lower layer signaling, and the like, either explicitly and/or implicitly.

Accordingly, a transmitting device (such as UE 210 in this example) may transmit or otherwise convey a first control signal (e.g. SCI-1) over a control channel (e.g., PSCCH) that identifies first scheduling information for a data transmission to a receiving device (such as UE 215 in this example). The transmitting device may also transmit a second control signal (e.g. SCI-2) over a shared channel (e.g. PSSCH) identifying second scheduling information for the data transmission. The receiving device may determine or otherwise identify the reference MCS table (e.g., the first MCS table) according to any of the alternatives discussed above, alone or in any combination. The receiving device may use the reference signal in its decoding of SCI-2, from which the second scheduling information (e.g., the second MCS table for the data transmission) can be determined. Accordingly, the receiving device may receive the data transmission over the shared channel (e.g., PSSCH). The receiving device may identify the second MCS table from the second control signal, and then use this second MCS table for decoding the data transmission.

As discussed, the receiving device may use the reference MCS table for decoding SCI-2 (e.g., use the first MCS table for decoding the second control signal). In some aspects, this may include determining a number of resource elements associated with the second control signal based on the reference MCS table. In some aspects, the receiving device may also perform PT-RS determination, TBS calculation, and the like, based on the reference MCS table. That is, the reference MCS table (e.g., the first MCS table) may be identified prior to performing any procedure that requires knowledge of the reference MCS table prior to decoding SCI-2.

Figure 3:
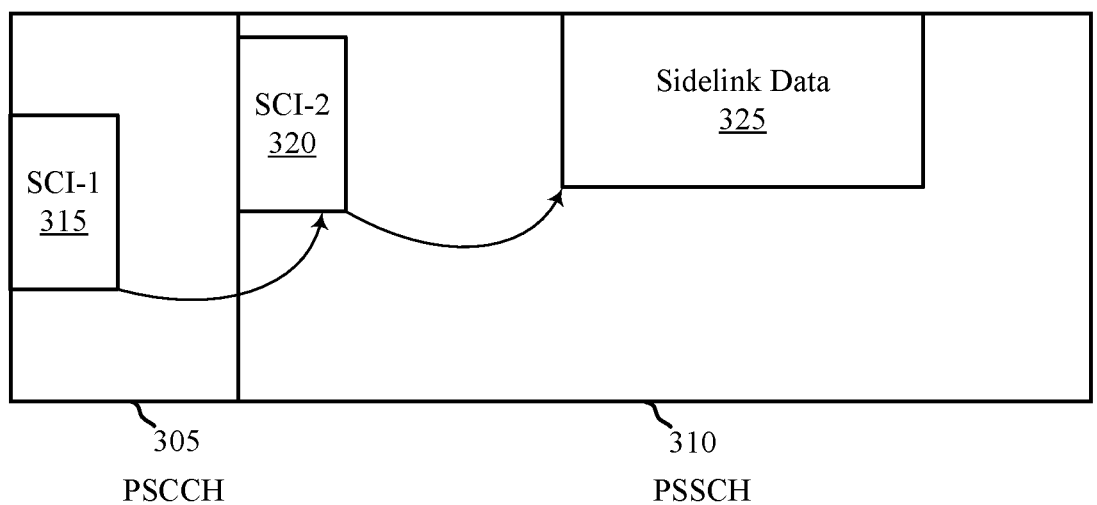
FIG. 3 illustrates an example of a slot configuration that supports a reference MCS table in sidelink signaling in accordance with aspects of the present disclosure.

FIG. 3 illustrates an example of a slot configuration 300 that supports reference MCS table in sidelink signaling in accordance with aspects of the present disclosure. In some examples, slot configuration 300 may implement aspects of wireless communication systems 100 and/or 200. Aspects of slot configuration 300 may be implemented by a receiving device and/or a transmitting device, which may be examples of the UE and/or base station as described herein. In some aspects, slot configuration 300 may be implemented by two UEs communicating over a sidelink connection, although the described techniques are not limited to a sidelink connection.

As discussed above, aspects of the described techniques provide mechanisms where a receiving device and/or transmitting device can identify a reference MCS table (e.g., a first MCS table) to be used for encoding/decoding, or otherwise processing, a second control signal 320 (e.g., SCI-2) received over a shared channel 310 (e.g., PSSCH) and indicating additional scheduling information for a data transmission 325 (e.g., sidelink data). That is, the transmitting device may transmit a first control signal 315 (e.g., SCI-1) over a control channel 305 (e.g., PSCCH). Broadly, the first control signal 315 may carry or otherwise convey first scheduling information for the data transmission 325 and/or at least some information used for decoding and/or processing a second control signal 320 received over the shared channel 310. For example, the first control signal 315 may identify at least a portion of the information needed for receiving and decoding the second control signal 320, but may not identify all of the required information.

Next, the transmitting device may transmit the second control signal 320 (e.g., SCI-2) over the shared channel 310 that identifies second scheduling information (e.g., additional or the rest of the scheduling information) for the data transmission 325. The receiving device may determine or otherwise identify the reference MCS table (e.g., the first MCS table), and use this for decoding or otherwise processing the second control signal 320. That is, the receiving device may utilize any of the alternatives discussed above, alone or in any combination, for determining or otherwise identifying the reference MCS table. Accordingly, the receiving device may receive the data transmission 325 over the shared channel 310 and decode the data transmission 325 using a second MCS table identified in the second control signal 320. That is, the second control signal 320 (e.g., SCI-2) may carry or convey, explicitly and/or implicitly, information identifying the second MCS table to be used for decoding the data transmission 325.

Figure 4:
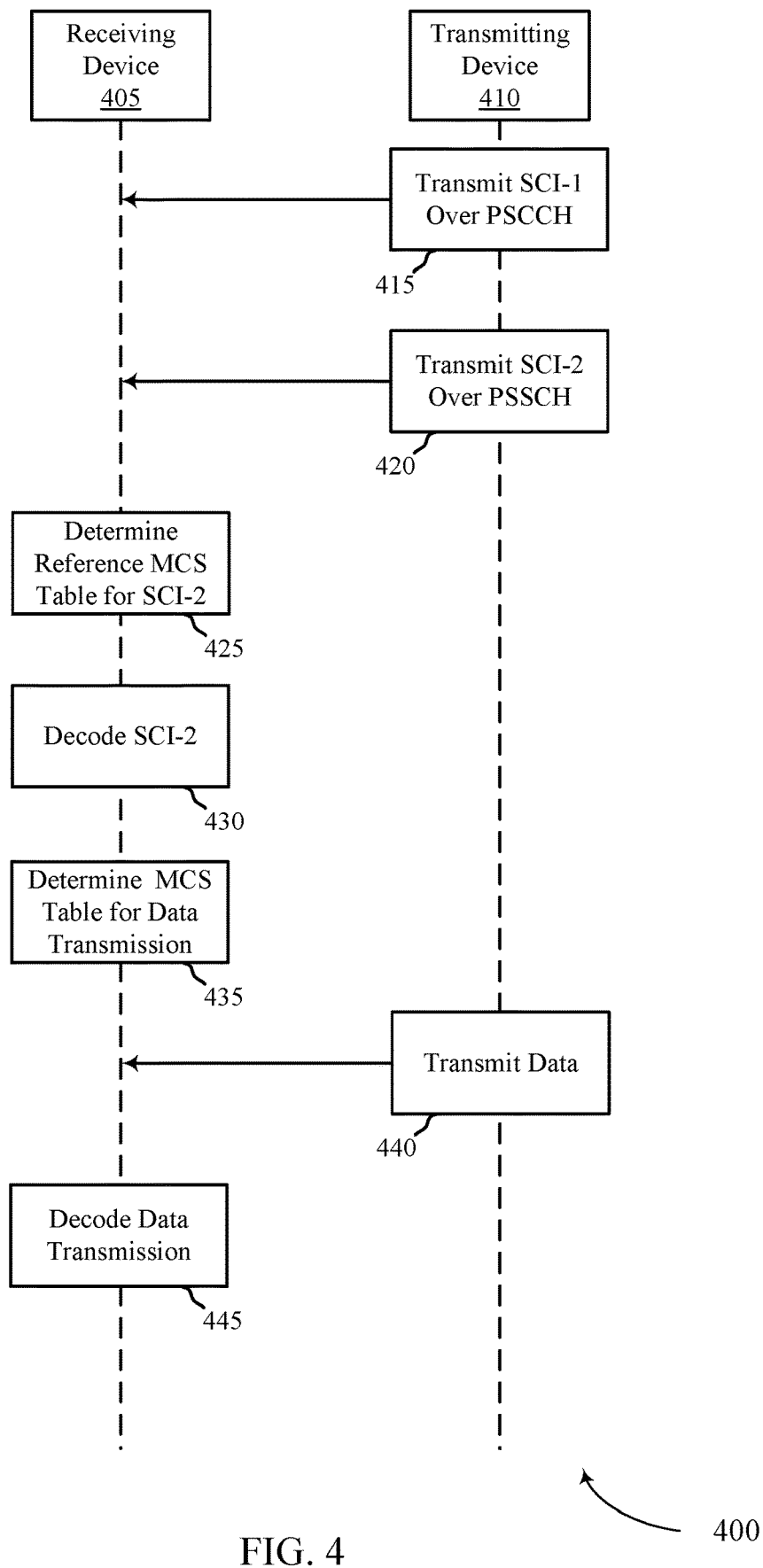
FIG. 4 illustrates an example of a process that supports a reference MCS table in sidelink signaling in accordance with aspects of the present disclosure.

FIG. 4 illustrates an example of a process 400 that supports reference MCS table in sidelink signaling in accordance with aspects of the present disclosure. In some examples, process 400 may implement aspects of wireless communication systems 100 and/or 200, and/or slot configuration 300. Aspects of process 400 may be implemented by receiving device 405 and/or transmitting device 410, which may be examples of a base station and/or UE as described herein.

At 415, transmitting device 410 may transmit (and receiving device 405 may receive) a first control signal (e.g., SCI-1) identifying a first scheduling information for a data transmission to receiving device 405. The first control signal may be transmitted over a control channel, such as PSCCH. In some aspects, the first control signal may indicate (e.g., in a second stage format field of SCI-1) information used to determine the payload size and format of SCI-2.

At 420, transmitting device 410 may transmit (and receiving device 405 may receive) a second control signal (e.g., SCI-2) identifying second scheduling information for the data transmission. In some aspects, the second control signal may be communicated over a shared channel, such as PSSCH.

At 425, receiving device 405 may determine or otherwise identify a first MCS table (e.g., the reference MCS table) to be used for decoding the second control signal (e.g., SCI-2). For example, the receiving device 405 may utilize any of the alternatives discussed above to determine or otherwise identify the first MCS table, e.g., using a specified MCS table, an MCS table configured for a resource pool, and/or an explicitly configured resource pool/MCS table.

At 430, receiving device 405 may decode the second control signal using the reference MCS table. For example, the receiving device 405 may determine the number of resource elements for SCI-2 based on the first MCS table. Additionally or alternatively, a receiving device 405 may perform PT-RS determination, a TBS calculation, and the like, based on the first MCS table.

At 435, receiving device 405 may determine or otherwise identify a second MCS table to be used for decoding the data transmission. For example, the second MCS table may be identified or otherwise determined based on information indicated, explicitly and/or implicitly, in the second control signal (e.g., SCI-2), e.g., in the second scheduling information.

At 440, transmitting device 410 may transmit (and receiving device 405 may receive) the data transmission. That is, the data transmission may be received over the shared channel (e.g., PSSCH) and using the first scheduling information indicated in the first control signal (e.g., SCI-1) and the second scheduling information indicated in the second control signal (e.g., SCI-2).

Accordingly and at 445, receiving device 405 may decode the data transmission using the first scheduling information and second scheduling information, in addition to the second MCS table. That is, the second MCS table may be a part of the second scheduling information indicated in SCI-2.

Figure 5:
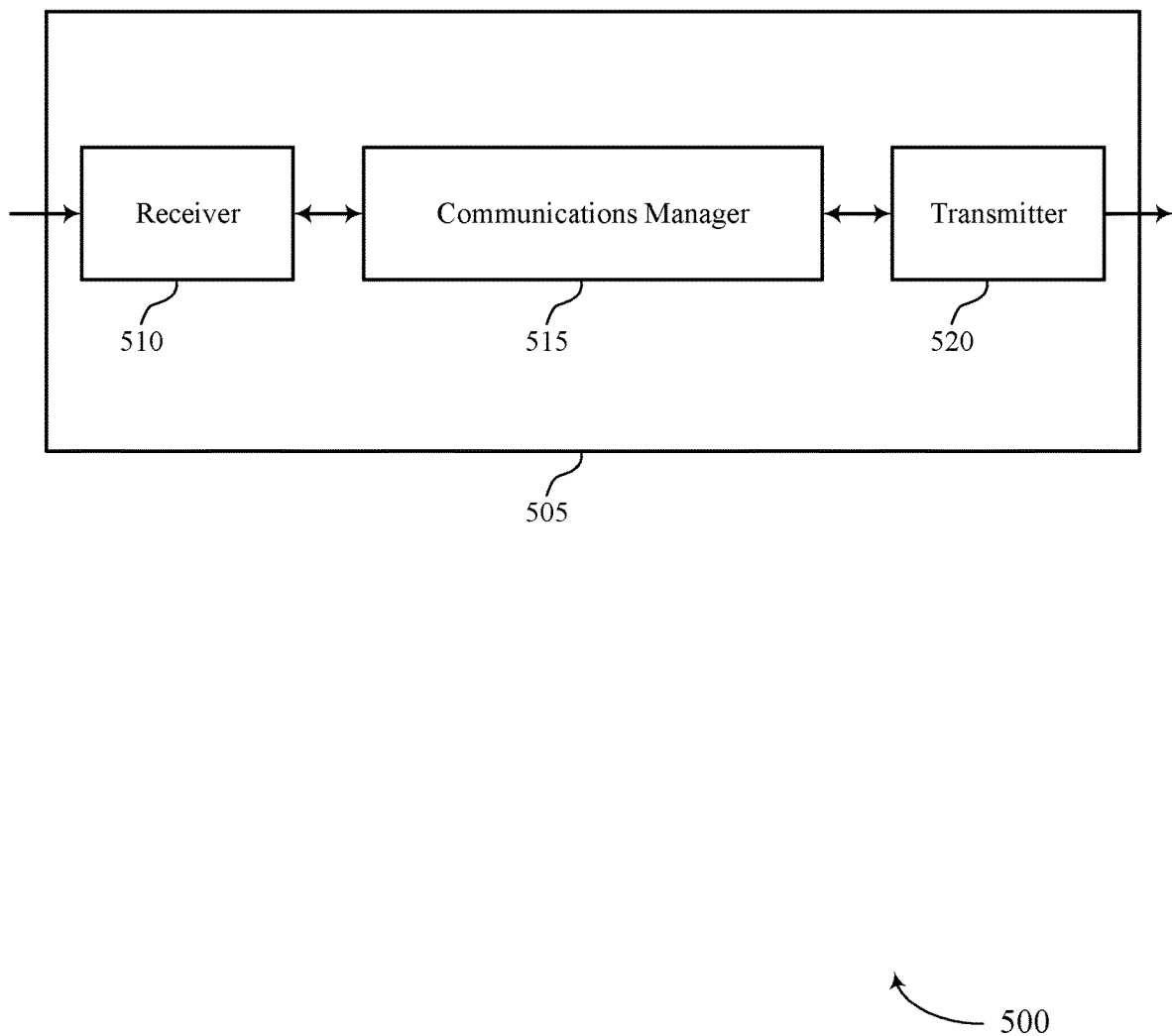
FIGS. 5 and 6 show block diagrams of devices that support a reference MCS table in sidelink signaling in accordance with aspects of the present disclosure.

FIG. 5 shows a block diagram 500 of a device 505 that supports a reference MCS table in sidelink signaling in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to a reference MCS table in sidelink signaling, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive, over a control channel, a first control signal identifying first scheduling information for a data transmission to the receiving device, determine a number of resource elements of a shared channel for a second control signal based at least in part on the first MCS table associated with the second control signal, receive, over the resource elements of the shared channel and based on the first control signal, the second control signal identifying second scheduling information for the data transmission, and decode the second control signal based on the first MCS table.

The communications manager 515 may also transmit, over a control channel, a first control signal identifying first scheduling information for a data transmission to a receiving device, determine a number of resource elements of a shared channel for a second control signal based at least in part on the first MCS table associated with the second control signal, and transmit, over the resource elements of the shared channel and based on the first control signal, the second control signal identifying second scheduling information for the data transmission, where the second control signal is decoded based on the first MCS table. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
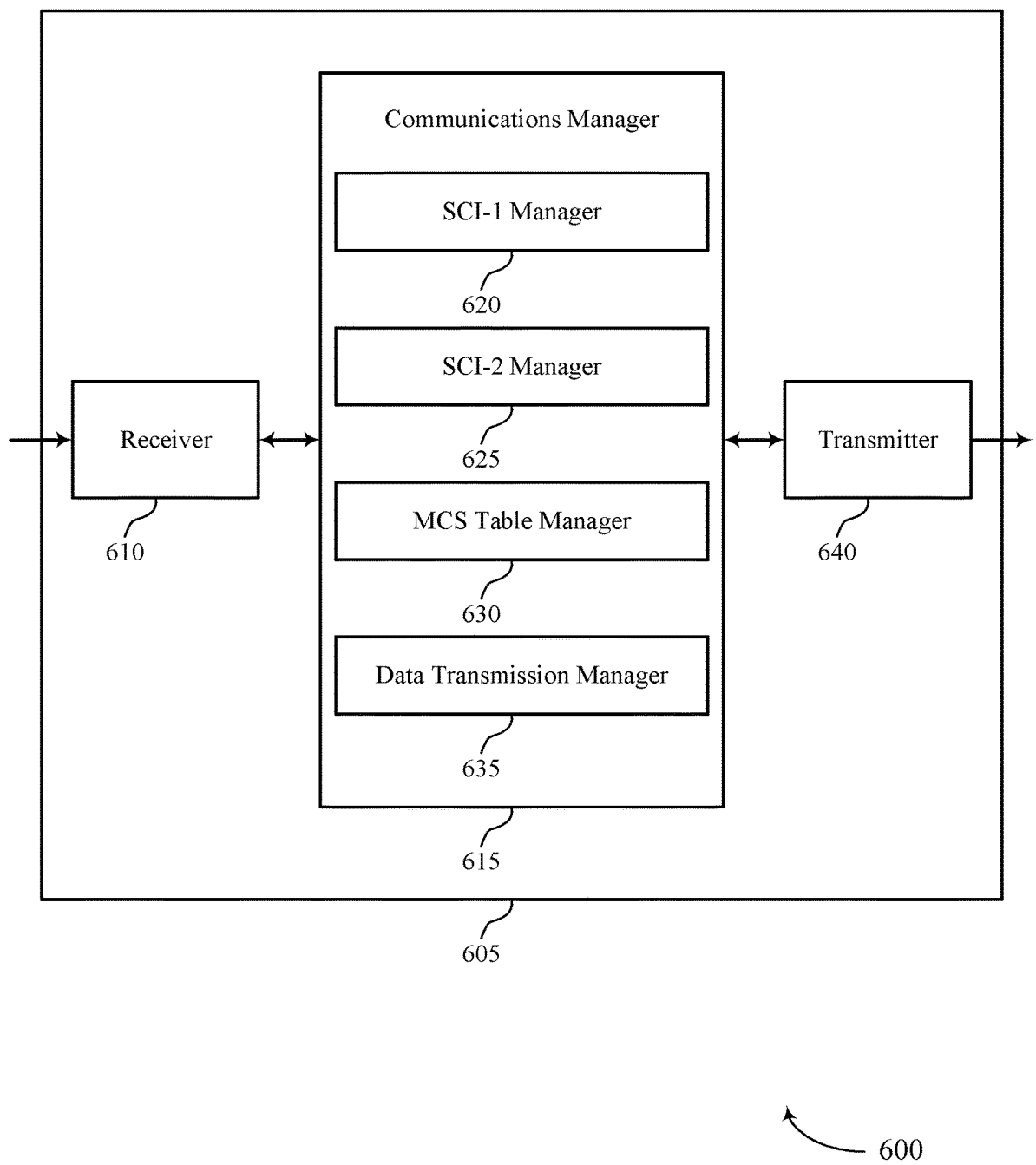

FIG. 6 shows a block diagram 600 of a device 605 that supports reference MCS table in sidelink signaling in accordance with aspects of the present disclosure. The device 605 may be an example of aspects of a device 505, a UE 115, or a base station 105 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to reference MCS table in sidelink signaling, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a SCI-1 manager 620, a SCI-2 manager 625, a MCS table manager 630, and a data transmission manager 635. The communications manager 615 may be an example of aspects of the communications manager 810 or 910 as described herein.

The SCI-1 manager 620 may receive, over a control channel, a first control signal identifying first scheduling information for a data transmission to the receiving device.

The SCI-2 manager 625 may determine a number of resource elements of the shared channel for a second control signal based on a first MCS table associated with the second control signal. The SCI-2 manager 625 may receive, over the resource elements of the shared channel and based on the first control signal, the second control signal identifying second scheduling information for the data transmission.

The MCS table manager 630 may decode the second control signal based on the first MCS table.

The data transmission manager 635 may receive, over the shared channel, the data transmission and decode the data transmission using a second MCS table identified in the second control signal.

The SCI-1 manager 620 may transmit, over a control channel, a first control signal identifying first scheduling information for a data transmission to a receiving device.

The SCI-2 manager 625 may determine a number of resource elements of the shared channel for a second control signal based on the first MCS table associated with the second control signal. The SCI-2 manager 625 may transmit, over the resource elements of the shared channel and based on the first control signal, the second control signal identifying second scheduling information for the data transmission, where the second control signal is decoded based on the first MCS table.

The data transmission manager 635 may transmit, over the shared channel, the data transmission, where the data transmission is decoded using a second MCS table identified in the second control signal.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
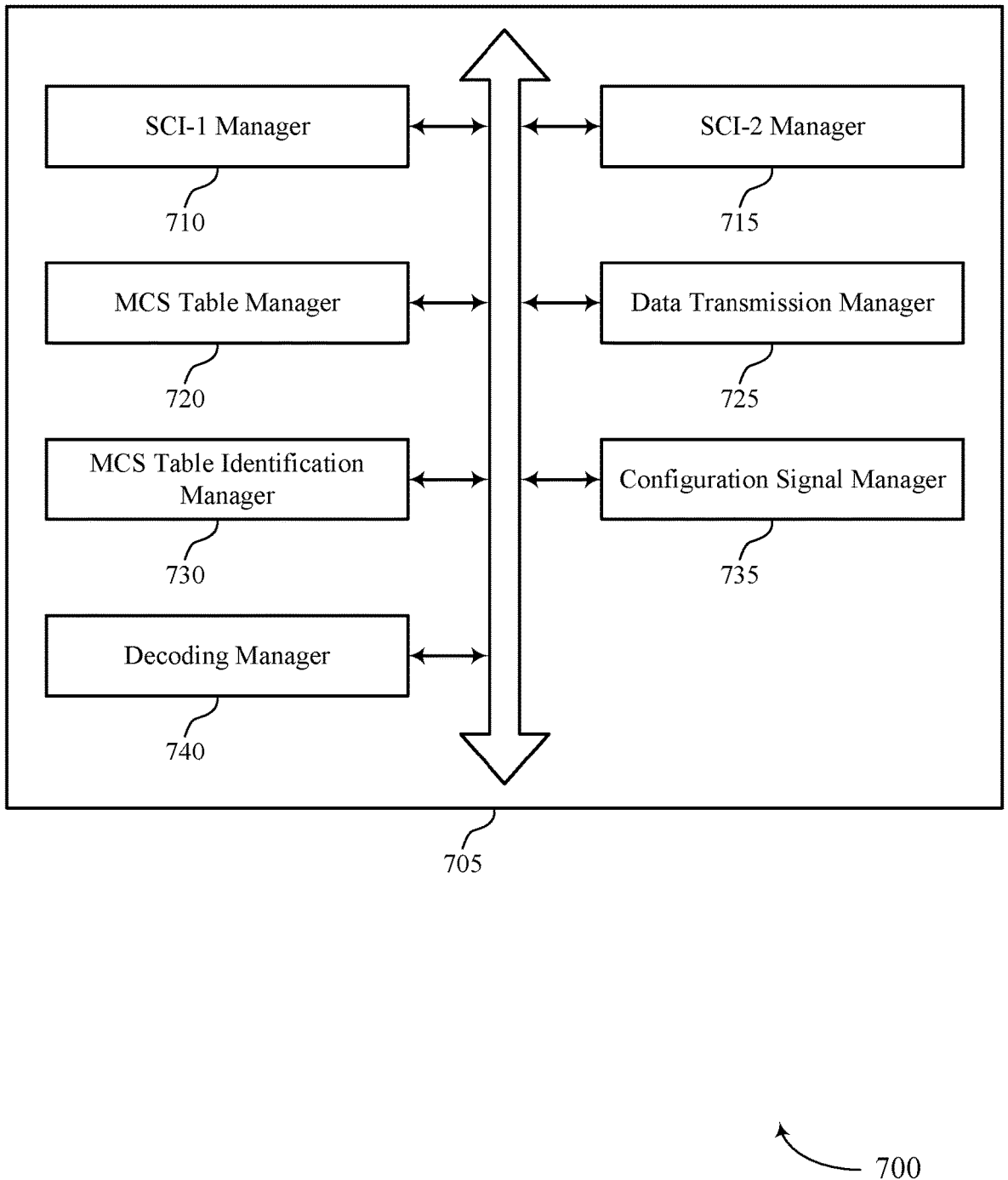
FIG. 7 shows a block diagram of a communications manager that supports a reference MCS table in sidelink signaling in accordance with aspects of the present disclosure.

FIG. 7 shows a block diagram 700 of a communications manager 705 that supports reference MCS table in sidelink signaling in accordance with aspects of the present disclosure. The communications manager 705 may be an example of aspects of a communications manager 515, a communications manager 615, or a communications manager 810 described herein. The communications manager 705 may include a SCI-1 manager 710, a SCI-2 manager 715, a MCS table manager 720, a data transmission manager 725, a MCS table identification manager 730, a configuration signal manager 735, and a decoding manager 740. Each of these modules may communicate, directly or indirectly, with one another (e.g., via one or more buses).

The SCI-1 manager 710 may receive, over a control channel, a first control signal identifying first scheduling information for a data transmission to the receiving device. In some examples, the SCI-1 manager 710 may transmit, over a control channel, a first control signal identifying first scheduling information for a data transmission to a receiving device.

The SCI-2 manager 715 may determine a number of resource elements of a shared channel for a second control signal based on the first MCS table associated with the second control signal. The SCI-2 manager 715 may receive, over the resource elements of the shared channel and based on the first control signal, the second control signal identifying second scheduling information for the data transmission. In some examples, the SCI-2 manager 715 may transmit, over the resource elements of the shared channel and based on the first control signal, a second control signal identifying second scheduling information for the data transmission, where the second control signal is decoded based on the first MCS table.

The MCS table manager 720 may decode the second control signal based on the first MCS table.

The data transmission manager 725 may receive, over the shared channel, the data transmission. In some examples, the data transmission manager 725 may decode the data transmission using a second MCS table identified in the second control signal. In some examples, the data transmission manager 725 may transmit, over the shared channel, the data transmission, where the data transmission is decoded using a second MCS table identified in the second control signal.

The MCS table identification manager 730 may identify the first MCS table based on the first scheduling information. In some examples, the MCS table identification manager 730 may identify a resource pool over which the second control signal is to be received. In some examples, the MCS table identification manager 730 may identify the first MCS table based on the resource pool. In some examples, the MCS table identification manager 730 may select the first MCS table based on the first scheduling information. In some examples, the MCS table identification manager 730 may select a resource pool over which the second control is to be received, where the first MCS table is based on the resource pool.

The configuration signal manager 735 may receive a configuration signal identifying a resource pool over which the second control signal is to be received and the first MCS table to be used for the resource pool. In some examples, the configuration signal manager 735 may identify the first MCS table based on the configuration signal. In some examples, the configuration signal manager 735 may transmit a configuration signal identifying a resource pool over which the second control signal is to be received and the first MCS table to be used for the resource pool, where the first MCS table is identified based on the configuration signal.

The decoding manager 740 may perform a determination of a number of resource elements associated with the second control signal based on the first MCS table. In some examples, the decoding manager 740 may perform at least one of a PR-RS determination, or a TBS calculation, or a combination thereof, based on the first MCS table.

Figure 8:
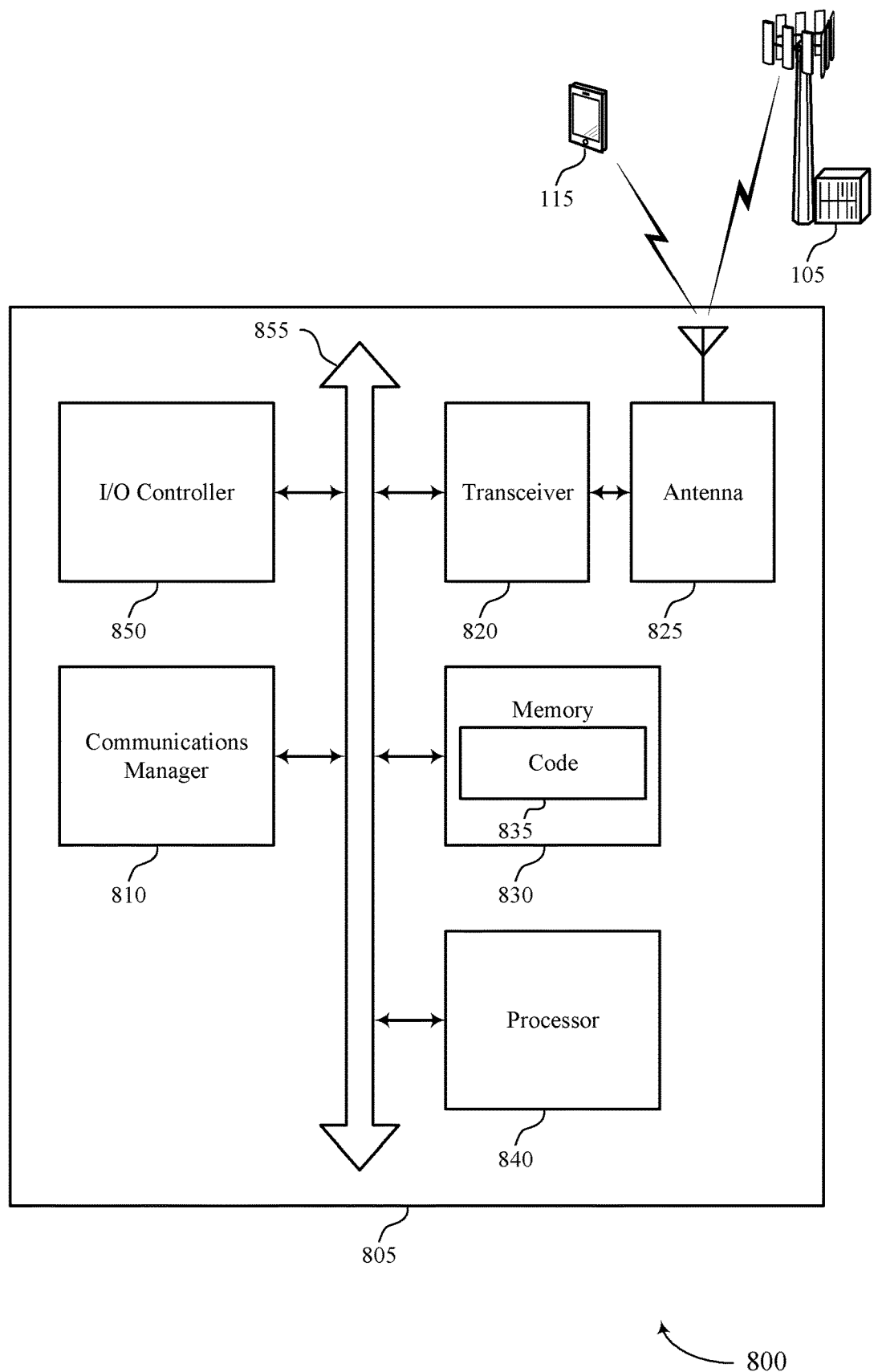
FIG. 8 shows a diagram of a system including a user equipment (UE) that supports a reference MCS table in sidelink signaling in accordance with aspects of the present disclosure.

FIG. 8 shows a diagram of a system 800 including a device 805 that supports reference MCS table in sidelink signaling in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive, over a control channel, a first control signal identifying first scheduling information for a data transmission to the receiving device, determine a number of resource elements of a shared channel for a second control signal based on the first MCS table associated with the second control signal, receive, over the resource elements of the shared channel and based on the first control signal, a second control signal identifying second scheduling information for the data transmission, and decode the second control signal based on the first MCS table.

The communications manager 810 may also transmit, over a control channel, a first control signal identifying first scheduling information for a data transmission to a receiving device, determine a number of resource elements of a shared channel for a second control signal based on the first MCS table associated with the second control signal, and transmit, over the resource elements of the shared channel and based on the first control signal, the second control signal identifying second scheduling information for the data transmission, where the second control signal is decoded based on the first MCS table.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference MCS table in sidelink signaling).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
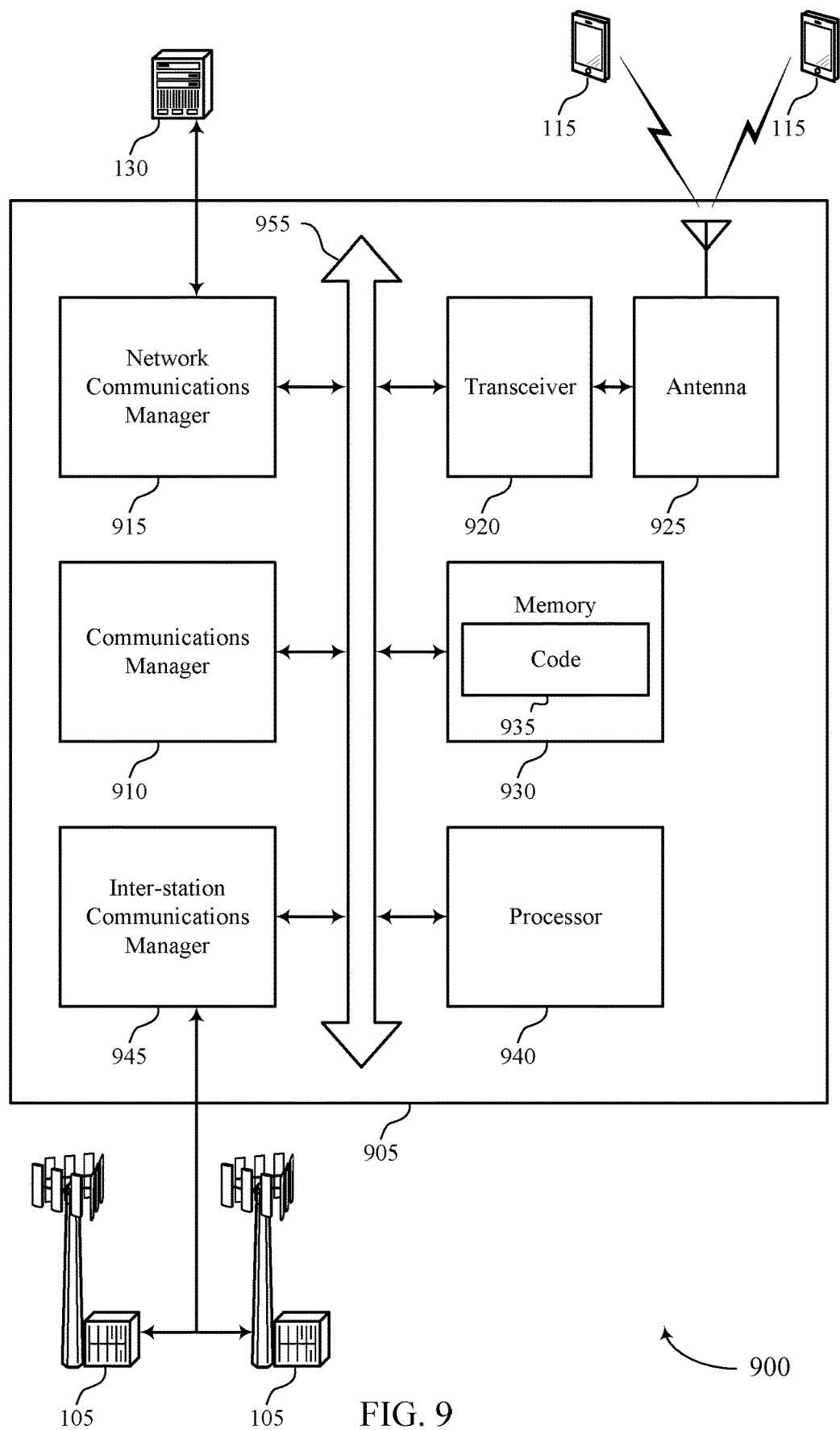
FIG. 9 shows a diagram of a system including a base station that supports a reference MCS table in sidelink signaling in accordance with aspects of the present disclosure.

FIG. 9 shows a diagram of a system 900 including a device 905 that supports reference MCS table in sidelink signaling in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive, over a control channel, a first control signal identifying first scheduling information for a data transmission to the receiving device, determine a number of resource elements of a shared channel for a second control signal based on the first MCS table associated with the second control signal, receive, over the resource elements of the shared channel and based on the first control signal, a second control signal identifying second scheduling information for the data transmission, and decode the second control signal based on the first MCS table.

The communications manager 910 may also transmit, over a control channel, a first control signal identifying first scheduling information for a data transmission to a receiving device, determine a number of resource elements of a shared channel for a second control signal based on the first MCS table associated with the second control signal, and transmit, over the resource elements of the shared channel and based on the first control signal, a second control signal identifying second scheduling information for the data transmission, where the second control signal is decoded based on the first MCS table.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting reference MCS table in sidelink signaling).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
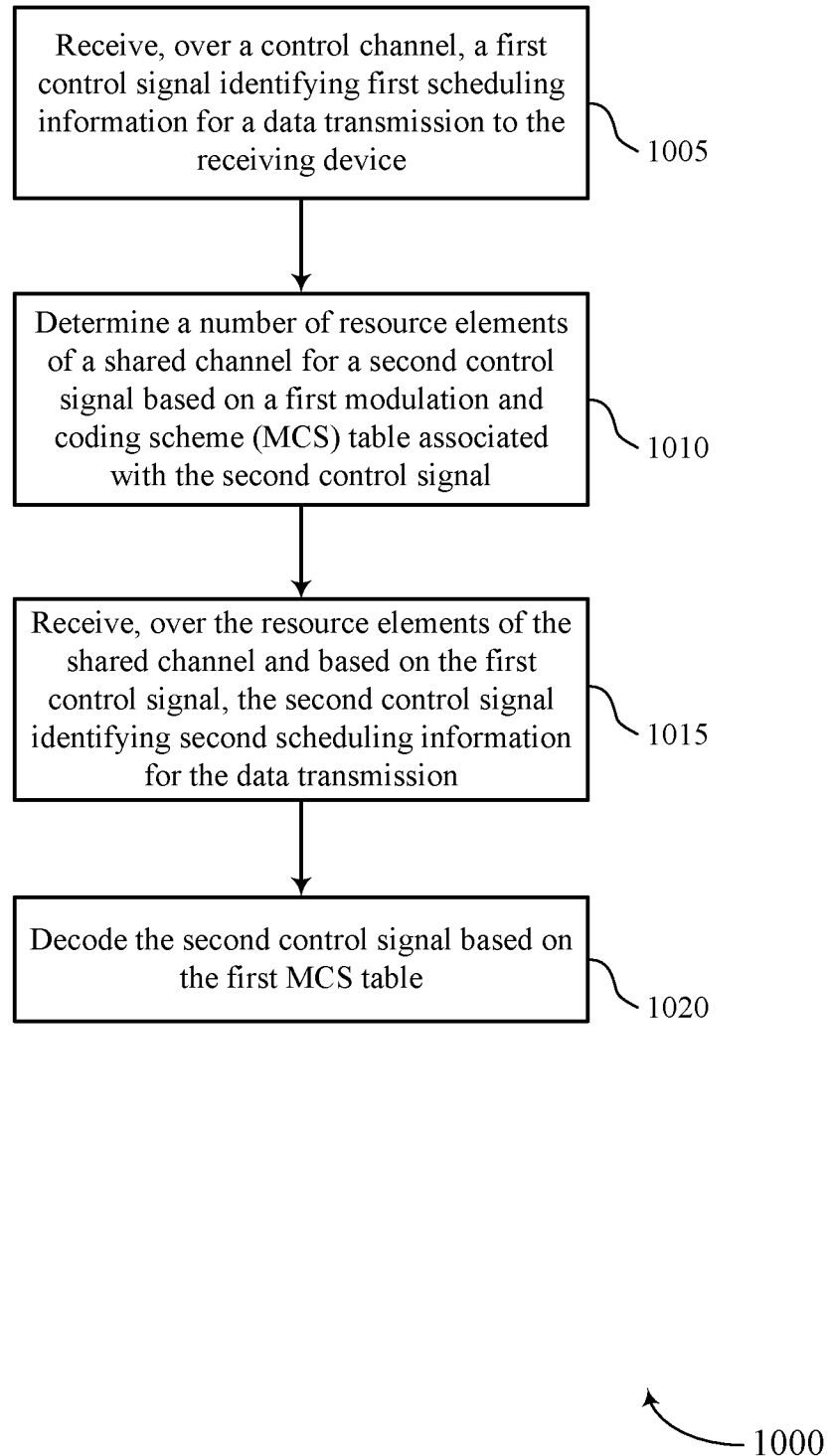
FIGS. 10 through 14 show flowcharts illustrating methods that support a reference MCS table in sidelink signaling in accordance with aspects of the present disclosure.

FIG. 10 shows a flowchart illustrating a method 1000 that supports reference MCS table in sidelink signaling in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may receive, over a control channel, a first control signal identifying first scheduling information for a data transmission to the receiving device. The operations of 1005 may be performed according to the methods described herein. In some examples, aspects of the operations of 1005 may be performed by a SCI-1 manager as described with reference to FIGS. 5 through 9.

At 1010, the UE or base station may determine a number of resource elements of a shared channel based on a first MCS table associated with the second control signal. The operations of 1010 may be performed according to the methods described herein. In some examples, aspects of the operations of 1010 may be performed by a SCI-2 manager as described with reference to FIGS. 5 through 9.

At 1015, the UE or base station may receive, over the resource elements of the shared channel and based on the first control signal, the second control signal identifying second scheduling information for the data transmission.

The operations of 1015 may be performed according to the methods described herein. In some examples, aspects of the operations of 1015 may be performed by a SCI-2 manager as described with reference to FIGS. 5 through 9.

At 1020, the UE or base station may decode the second control signal based on the first MCS table. The operations of 1020 may be performed according to the methods described herein. In some examples, aspects of the operations of 1020 may be performed by a MCS table manager as described with reference to FIGS. 5 through 9.

Figure 11:
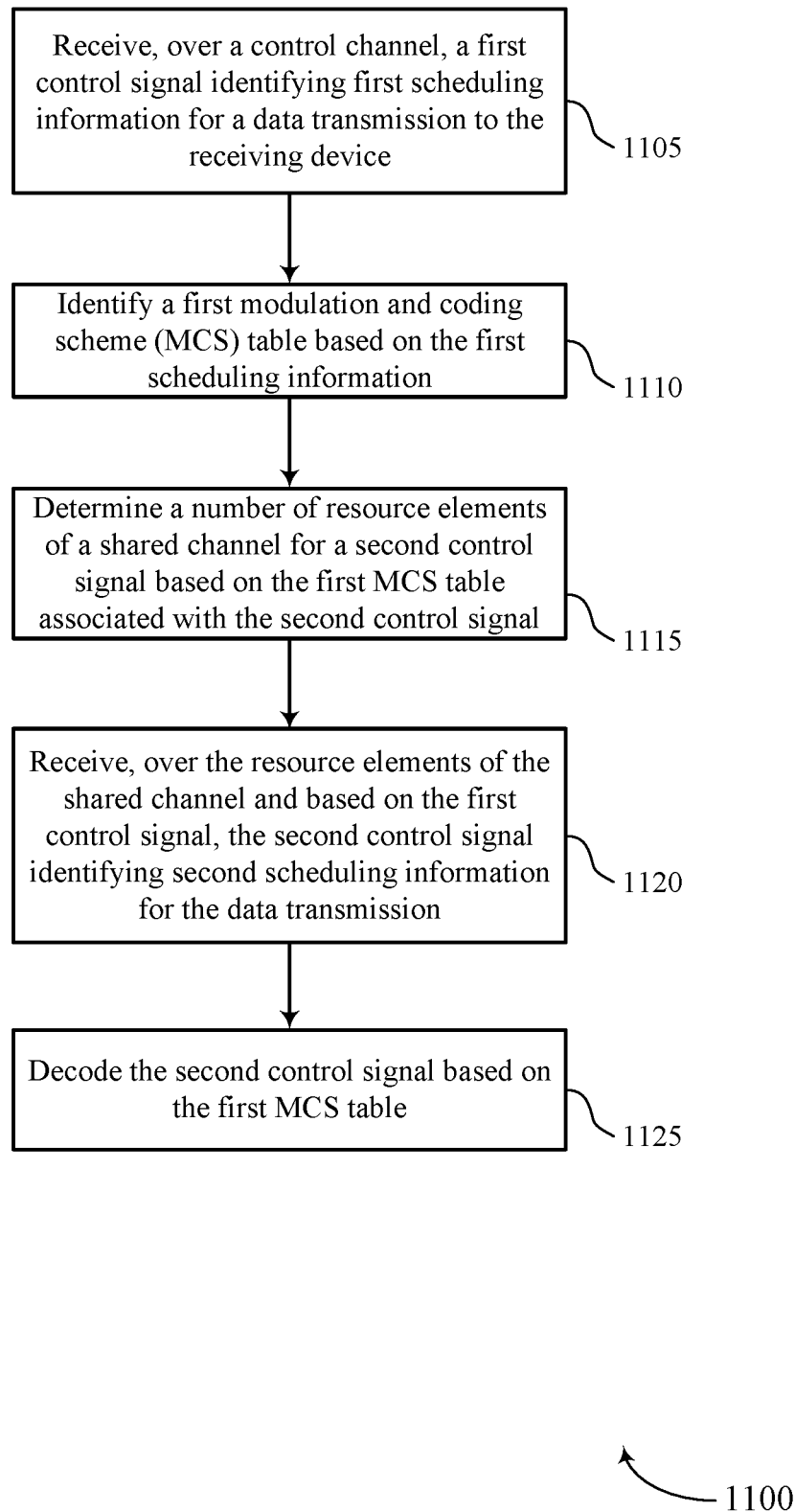

FIG. 11 shows a flowchart illustrating a method 1100 that supports reference MCS table in sidelink signaling in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may receive, over a control channel, a first control signal identifying first scheduling information for a data transmission to the receiving device. The operations of 1105 may be performed according to the methods described herein. In some examples, aspects of the operations of 1105 may be performed by a SCI-1 manager as described with reference to FIGS. 5 through 9.

At 1110, the UE or base station may identify a first MCS table based on the first scheduling information. The operations of 1110 may be performed according to the methods described herein. In some examples, aspects of the operations of 1110 may be performed by a SCI-2 manager as described with reference to FIGS. 5 through 9.

At 1115, the UE or base station may determine a number of resource elements of a shared channel for a second control signal based on a first MCS table associated with the second control signal. The operations of 1115 may be performed according to the methods described herein. In some examples, aspects of the operations of 1115 may be performed by a SCI-2 manager as described with reference to FIGS. 5 through 9.

At 1120, the UE or base station may receive, over the resource elements of the shared channel and based on the first control signal, the second control signal identifying second scheduling information for the data transmission. The operations of 1120 may be performed according to the methods described herein. In some examples, aspects of the operations of 1120 may be performed by a SCI-2 manager as described with reference to FIGS. 5 through 9.

At 1125, the UE or base station may decode the second control signal based on the first MCS table. The operations of 1125 may be performed according to the methods described herein. In some examples, aspects of the operations of 1125 may be performed by a MCS table manager as described with reference to FIGS. 5 through 9.

Figure 12:
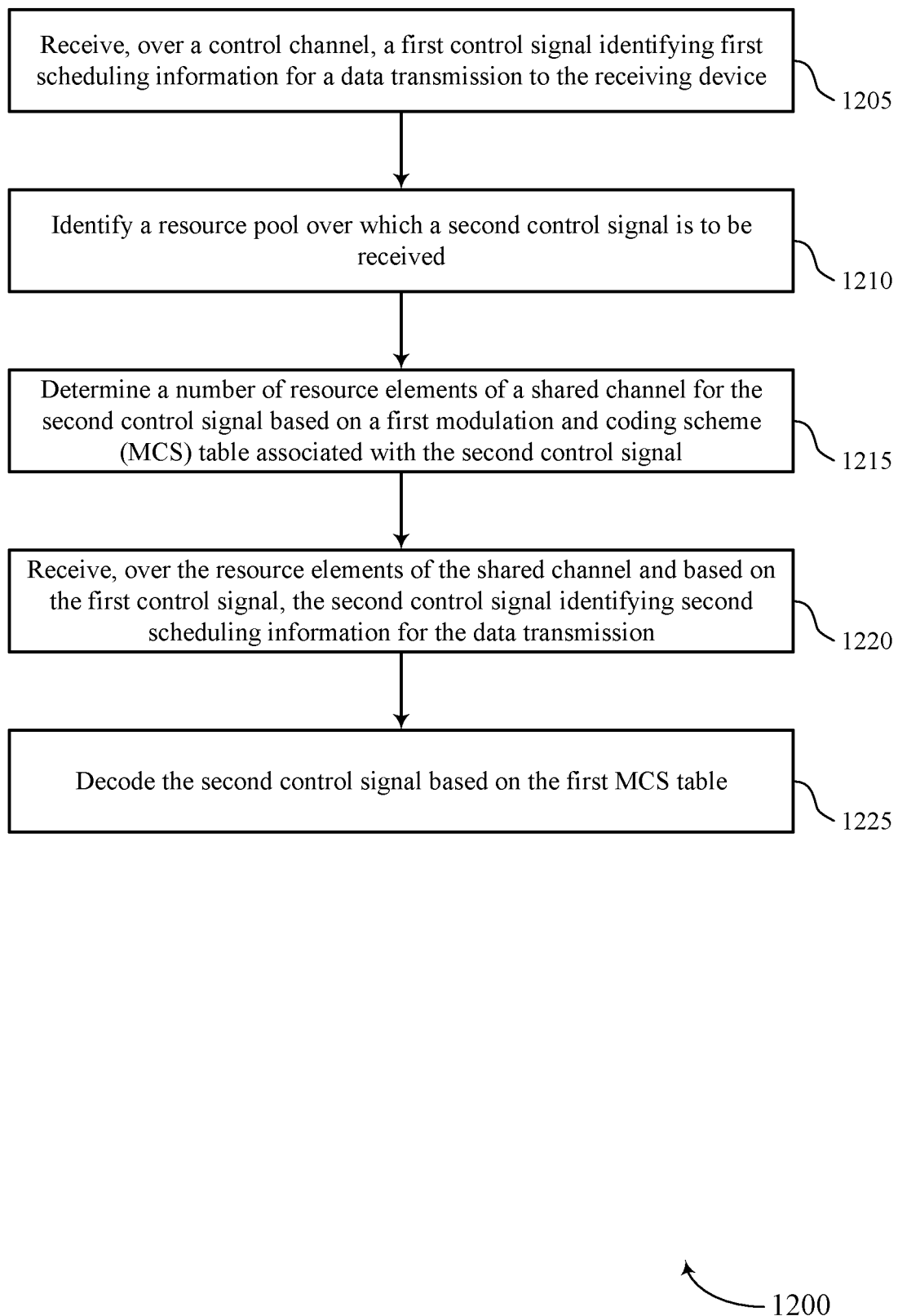

FIG. 12 shows a flowchart illustrating a method 1200 that supports reference MCS table in sidelink signaling in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive, over a control channel, a first control signal identifying first scheduling information for a data transmission to the receiving device. The operations of 1205 may be performed according to the methods described herein. In some examples, aspects of the operations of 1205 may be performed by a SCI-1 manager as described with reference to FIGS. 5 through 9.

At 1210, the UE or base station may identify a resource pool over which a second control signal is to be received. The operations of 1210 may be performed according to the methods described herein. In some examples, aspects of the operations of 1210 may be performed by a MCS table identification manager as described with reference to FIGS. 5 through 9.

At 1215, the UE or base station may determine a number of resource elements of a shared channel for a second control signal based on the first MCS table associated with the second control signal. The operations of 1215 may be performed according to the methods described herein. In some examples, aspects of the operations of 1215 may be performed by a SCI-2 manager as described with reference to FIGS. 5 through 9.

At 1220, the UE or base station may receive, over the resource elements of the shared channel and based on the first control signal, the second control signal identifying second scheduling information for the data transmission. The operations of 1220 may be performed according to the methods described herein. In some examples, aspects of the operations of 1220 may be performed by a SCI-2 manager as described with reference to FIGS. 5 through 9.

At 1225, the UE or base station may decode the second control signal based on the first MCS table. The operations of 1225 may be performed according to the methods described herein. In some examples, aspects of the operations of 1225 may be performed by a MCS table manager as described with reference to FIGS. 5 through 9.

Figure 13:
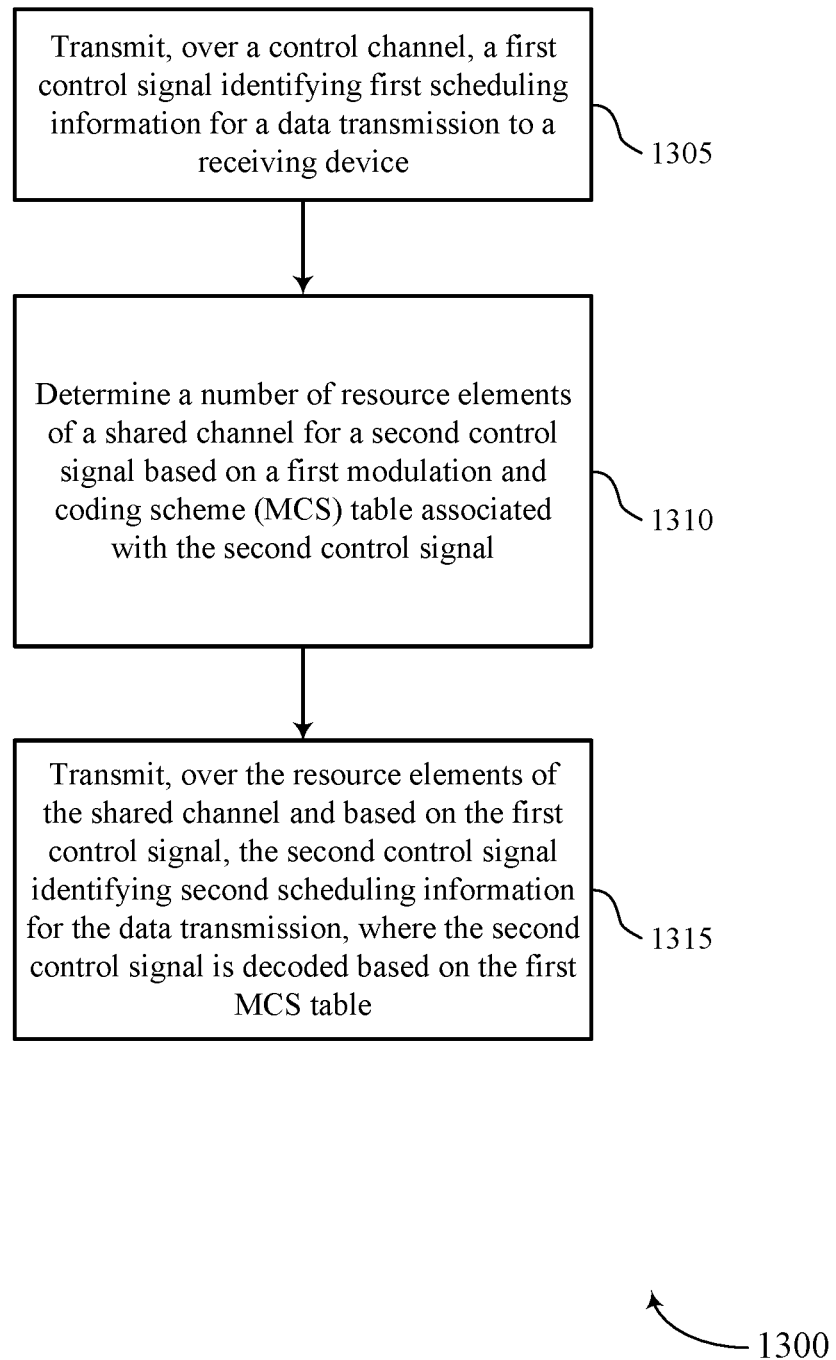

FIG. 13 shows a flowchart illustrating a method 1300 that supports reference MCS table in sidelink signaling in accordance with aspects of the present disclosure. The operations of method 1300 may be implemented by a UE 115 or base station 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may transmit, over a control channel, a first control signal identifying first scheduling information for a data transmission to a receiving device. The operations of 1305 may be performed according to the methods described herein. In some examples, aspects of the operations of 1305 may be performed by a SCI-1 manager as described with reference to FIGS. 5 through 9.

At 1310, the UE or base station may determine a number of resource elements of a shared channel for a second control signal based on a first MCS table associated with the second control signal. The operations of 1310 may be performed according to the methods described herein. In some examples, aspects of the operations of 1310 may be performed by a SCI-2 manager as described with reference to FIGS. 5 through 9.

At 1315, the UE or base station may transmit, over the resource elements of the shared channel and based on the first control signal, the second control signal identifying second scheduling information for the data transmission, where the second control signal is decoded based on the first MCS table. The operations of 1310 may be performed according to the methods described herein. In some examples, aspects of the operations of 1310 may be performed by a SCI-2 manager as described with reference to FIGS. 5 through 9.

Figure 14:
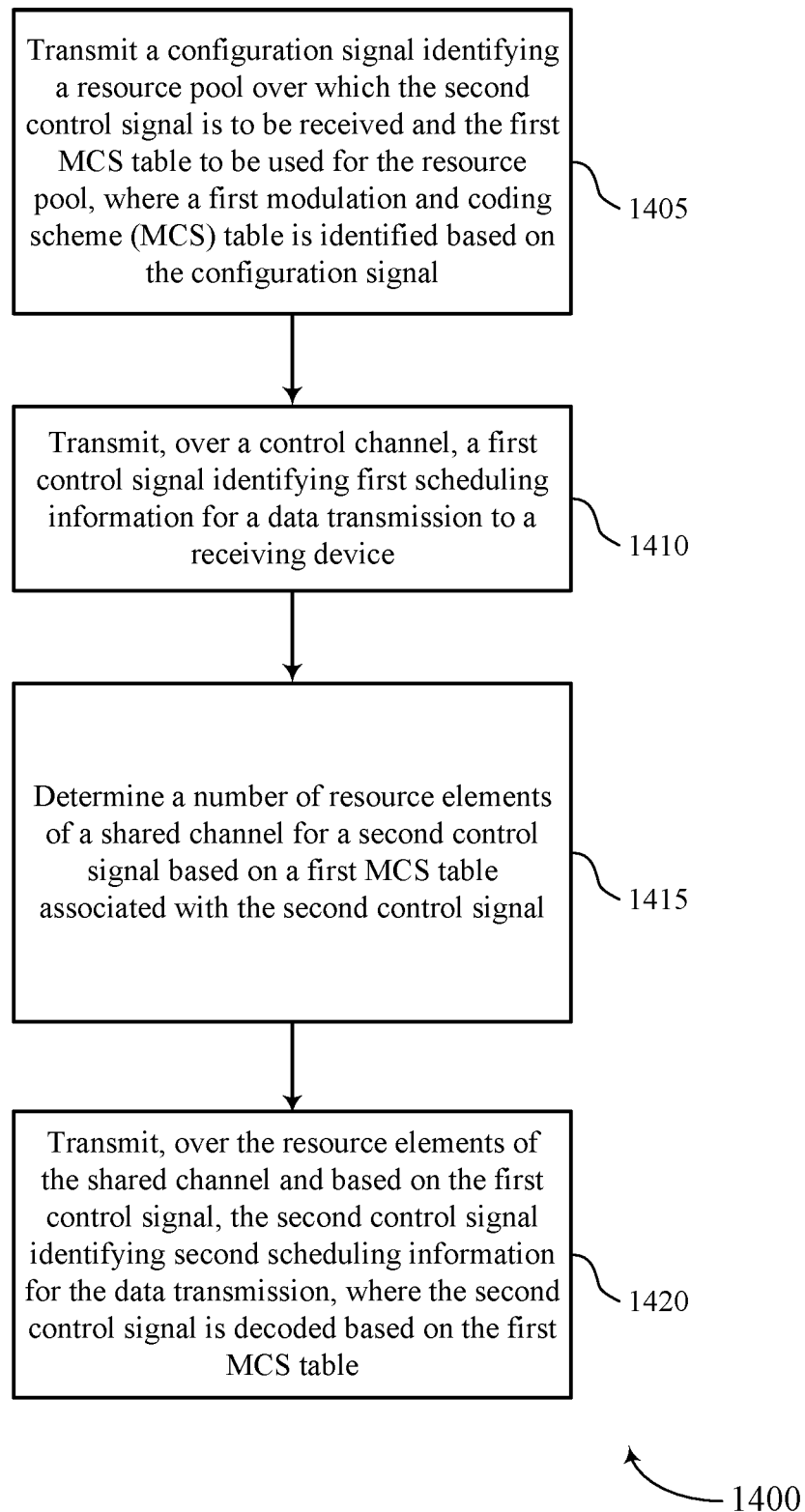

FIG. 14 shows a flowchart illustrating a method 1400 that supports reference MCS table in sidelink signaling in accordance with aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may transmit a configuration signal identifying a resource pool over which the second control signal is to be received and the first MCS table to be used for the resource pool, where the first MCS table is identified based on the configuration signal. The operations of 1405 may be performed according to the methods described herein. In some examples, aspects of the operations of 1405 may be performed by a configuration signal manager as described with reference to FIGS. 5 through 9.

At 1410, the UE or base station may transmit, over a control channel, a first control signal identifying first scheduling information for a data transmission to a receiving device. The operations of 1410 may be performed according to the methods described herein. In some examples, aspects of the operations of 1410 may be performed by a SCI-1 manager as described with reference to FIGS. 5 through 9.

At 1415, the UE or base station may determine a number of resource elements of a shared channel for a second control signal based on a first MCS table associated with the second control signal. The operations of 1415 may be performed according to the methods described herein. In some examples, aspects of the operations of 1415 may be performed by a SCI-2 manager as described with reference to FIGS. 5 through 9.

At 1420, the UE or base station may transmit, over the resource elements of the shared channel and based on the first control signal, the second control signal identifying second scheduling information for the data transmission, where the second control signal is decoded based on the first MCS table. The operations of 1415 may be performed according to the methods described herein. In some examples, aspects of the operations of 1415 may be performed by a SCI-2 manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a receiving device, comprising: receiving, over a control channel, a first control signal identifying first scheduling information for a data transmission to the receiving device; determining a number of resource elements of a shared channel for a second control signal based at least in part on a first MCS table associated with the second control signal; receiving, over the resource elements of the shared channel and based at least in part on the first control signal, the second control signal identifying second scheduling information for the data transmission; decoding the second control signal based at least in part on the first MCS table; and.

Aspect 2: The method of aspect 1, further comprising: identifying the first MCS table based at least in part on the first scheduling information.

Aspect 3: The method of any of aspects 1 through 2, further comprising:
identifying a resource pool over which the second control signal is to be received; and
identifying the first MCS table based at least in part on the resource pool.

Aspect 4: The method of any of aspects 1 through 3, further comprising: receiving a configuration signal identifying a resource pool over which the second control signal is to be received and the first MCS table to be used for the resource pool; and identifying the first MCS table based at least in part on the configuration signal.

Aspect 5: The method of any of aspects 1 through 4, further comprising: performing at least one of a phase-tracking reference signal determination, or a transport block size calculation, or a combination thereof, based at least in part on the first MCS table.

Aspect 6: The method of any of aspects 1 through 5, further comprising: receiving, over the shared channel, the data transmission; and decoding the data transmission using a second MCS table identified in the second control signal.

Aspect 7: A method for wireless communication at a transmitting device, comprising: transmitting, over a control channel, a first control signal identifying first scheduling information for a data transmission to a receiving device; determining a number of resource elements of a shared channel for a second control signal based at least in part on a first MCS table associated with the second control signal; and transmitting, over the resource elements of the shared channel and based at least in part on the first control signal, the second control signal identifying second scheduling information for the data transmission, wherein the second control signal is decoded based at least in part on the first MCS table.

Aspect 8: The method of aspect 7, further comprising: selecting the first MCS table based at least in part on the first scheduling information.

Aspect 9: The method of any of aspects 7 through 8, further comprising: selecting a resource pool over which the second control is to be received, wherein the first MCS table is based at least in part on the resource pool.

Aspect 10: The method of any of aspects 7 through 9, further comprising: transmitting a configuration signal identifying a resource pool over which the second control signal is to be received and the first MCS table to be used for the resource pool, wherein the first MCS table is identified based at least in part on the configuration signal.

Aspect 11: The method of any of aspects 7 through 10, further comprising: transmitting, over the shared channel, the data transmission, wherein the data transmission is decoded using a second MCS table identified in the second control signal.

Aspect 12: An apparatus for wireless communication at a receiving device, comprising a processor; memory coupled with the processor; and instructions stored in the memory and executable by the processor to cause the apparatus to perform a method of any of aspects 1 through 6.

Aspect 13: An apparatus for wireless communication at a receiving device, comprising at least one means for performing a method of any of aspects 1 through 6.

Aspect 14: A non-transitory computer-readable medium storing code for wireless communication at a receiving device, the code comprising instructions executable by a processor to perform a method of any of aspects 1 through 6.

Aspect 15: An apparatus for wireless communication at a transmitting device, comprising a processor; memory coupled with the processor; and instructions stored in the memory and executable by the processor to cause the apparatus to perform a method of any of aspects 7 through 11.

Aspect 16: An apparatus for wireless communication at a transmitting device, comprising at least one means for performing a method of any of aspects 7 through 11.

Aspect 17: A non-transitory computer-readable medium storing code for wireless communication at a transmitting device, the code comprising instructions executable by a processor to perform a method of any of aspects 7 through 11.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An gNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a receiving device, comprising:
   receiving, over a control channel, a first control signal identifying first scheduling information for a data transmission to the receiving device;
   determining a number of resource elements of a shared channel for a second control signal based at least in part on a first modulation and coding scheme (MCS) table for receiving the second control signal, wherein the first MCS table is identified based at least in part on a resource pool over which the second control signal is to be received;
   receiving, over the number of resource elements of the shared channel and based at least in part on the first control signal, the second control signal identifying second scheduling information for the data transmission; and
   decoding the second control signal based at least in part on the first MCS table.

2. The method of claim 1, further comprising:
   performing at least one of a phase-tracking reference signal determination, or a transport block size calculation, or a combination thereof, based at least in part on the first MCS table.

3. The method of claim 1, further comprising:
   receiving, over the shared channel, the data transmission; and
   decoding the data transmission using a second MCS table identified in the second control signal.

4. A method for wireless communication at a transmitting device, comprising:
   transmitting, over a control channel, a first control signal identifying first scheduling information for a data transmission to a receiving device;
   determining a number of resource elements of a shared channel for a second control signal based at least in part on a first modulation and coding scheme (MCS) table for receiving the second control signal, wherein the first MCS table is based at least in part on selecting a resource pool over which the second control signal is to be received; and
   transmitting, over the number of resource elements of the shared channel and based at least in part on the first control signal, the second control signal identifying second scheduling information for the data transmission, wherein the second control signal is decoded based at least in part on the first MCS table.

5. The method of claim 4, further comprising:
   transmitting, over the shared channel, the data transmission, wherein the data transmission is decoded using a second MCS table identified in the second control signal.

6. An apparatus for wireless communication at a receiving device, comprising:
   a processor,
   memory coupled with the processor; and
   instructions stored in the memory and executable by the processor to cause the apparatus to:

receive, over a control channel, a first control signal identifying first scheduling information for a data transmission to the receiving device;

determine a number of resource elements of a shared channel for a second control signal based at least in part on a first modulation and coding scheme (MCS) table for receiving the second control signal, wherein the first MCS table is identified based at least in part on a resource pool over which the second control signal is to be received;

receive, over the number of resource elements of the shared channel and based at least in part on the first control signal, the second control signal identifying second scheduling information for the data transmission; and decode the second control signal based at least in part on the first MCS table.

7. The apparatus of claim 6, wherein the instructions are further executable by the processor to cause the apparatus to:
perform at least one of a phase-tracking reference signal determination, or a transport block size calculation, or a combination thereof, based at least in part on the first MCS table.

8. The apparatus of claim 6, wherein the instructions are further executable by the processor to cause the apparatus to:
receive, over the shared channel, the data transmission; and
decode the data transmission using a second MCS table identified in the second control signal.

9. An apparatus for wireless communication at a transmitting device, comprising:
a processor,
memory coupled with the processor; and
instructions stored in the memory and executable by the processor to cause the apparatus to:
transmit, over a control channel, a first control signal identifying first scheduling information for a data transmission to a receiving device;
determine a number of resource elements of a shared channel for a second control signal based at least in part on a first modulation and coding scheme (MCS) table for receiving the second control signal, wherein the first MCS table is based at least in part on selecting a resource pool over which the second control signal is to be received; and
transmit, over the number of resource elements of the shared channel and based at least in part on the first control signal, the second control signal identifying second scheduling information for the data transmission, wherein the second control signal is decoded based at least in part on the first MCS table.

10. The apparatus of claim 9, wherein the instructions are further executable by the processor to cause the apparatus to:
transmit, over the shared channel, the data transmission, wherein the data transmission is decoded using a second MCS table identified in the second control signal.

* * * * *